No. 635,649. Patented Oct. 24, 1899.
B. A. BROOKS.
PRINTING APPARATUS.
(Application filed Nov. 18, 1889.)
(No Model.) 9 Sheets—Sheet 1.
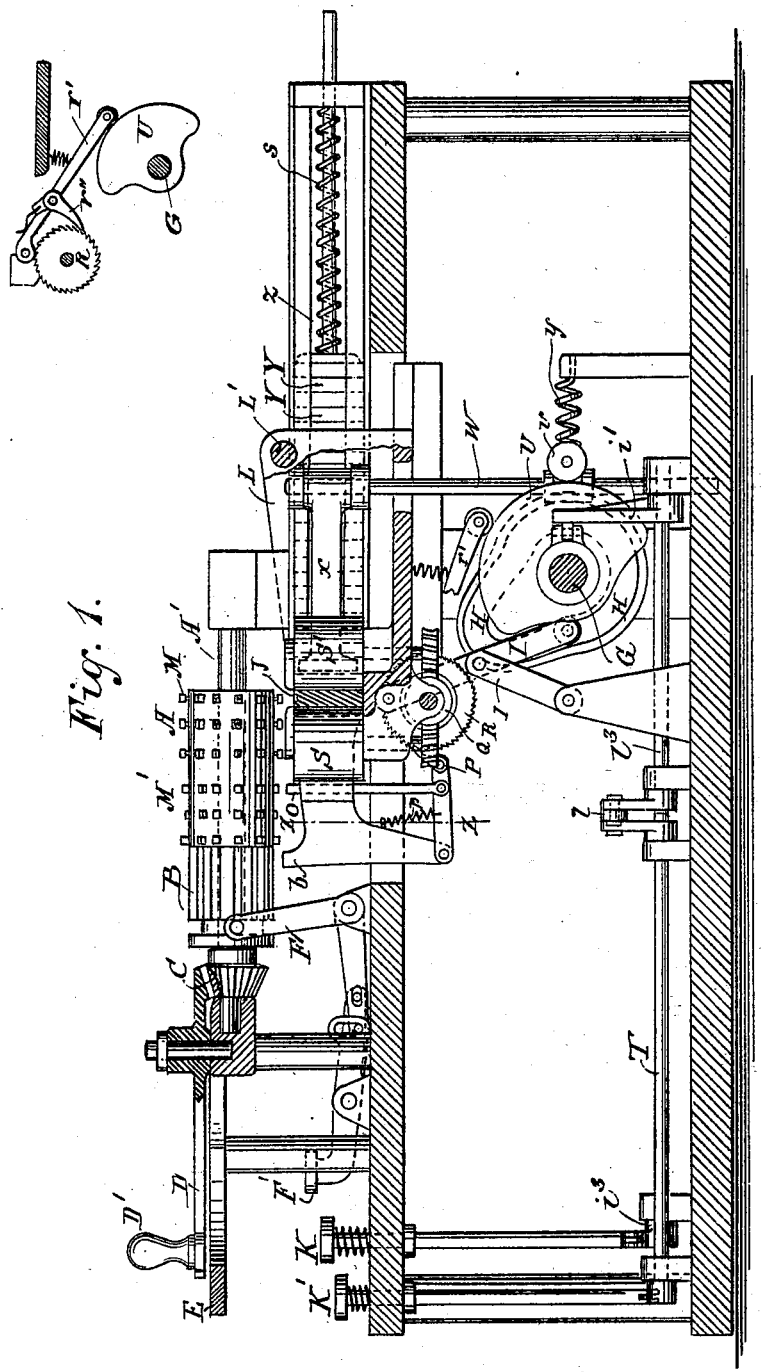
Witnesses:
Inventor:
Byron A. Brooks

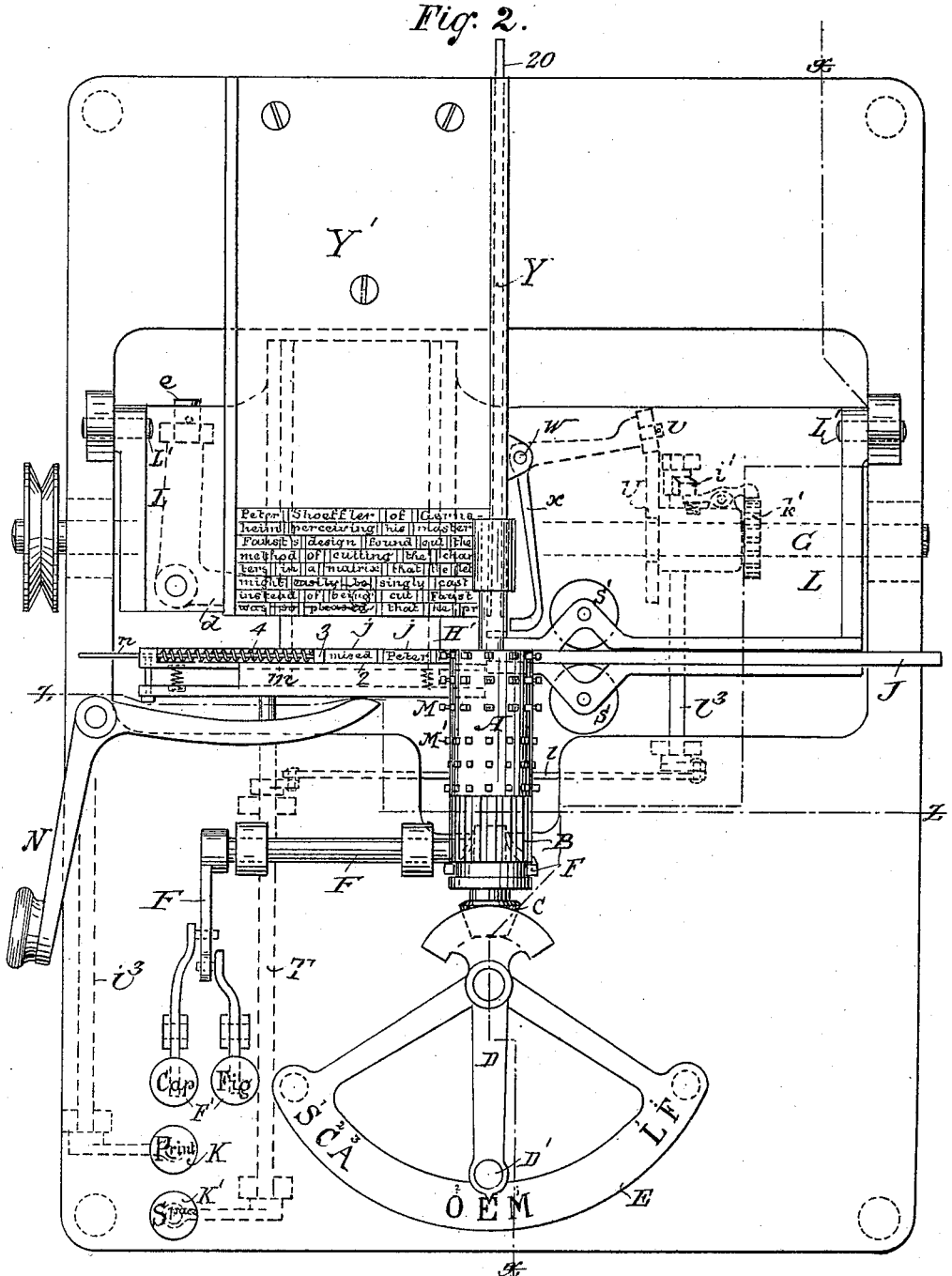

No. 635,649.  
B. A. BROOKS.  
PRINTING APPARATUS.  
(Application filed Nov. 18, 1889.)  
Patented Oct. 24, 1899.
(No Model.) 9 Sheets—Sheet 3.
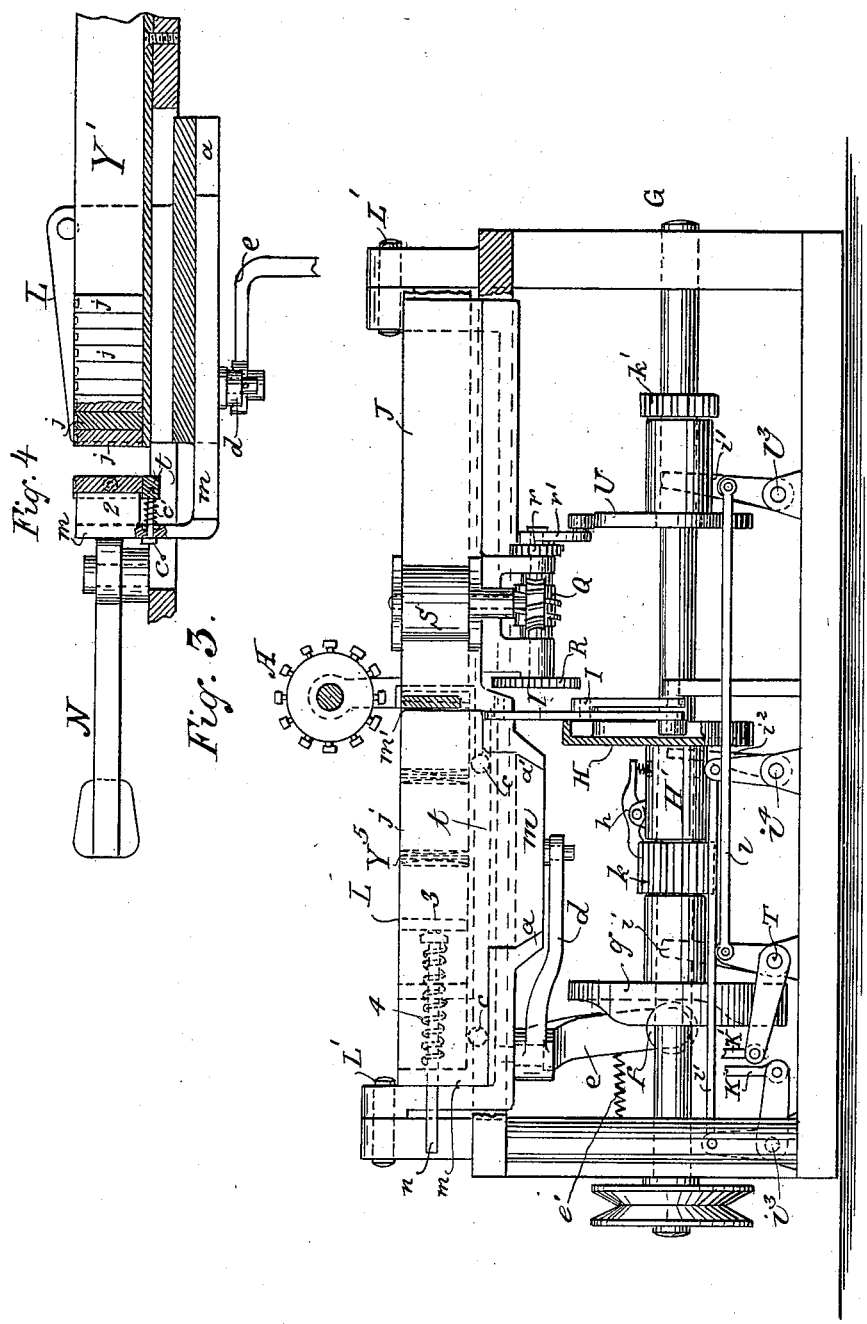
Witnesses:
Inventor:

No. 635,649. Patented Oct. 24, 1899.
B. A. BROOKS.
PRINTING APPARATUS.
(Application filed Nov. 18, 1889.)
(No Model.) 9 Sheets—Sheet 4.
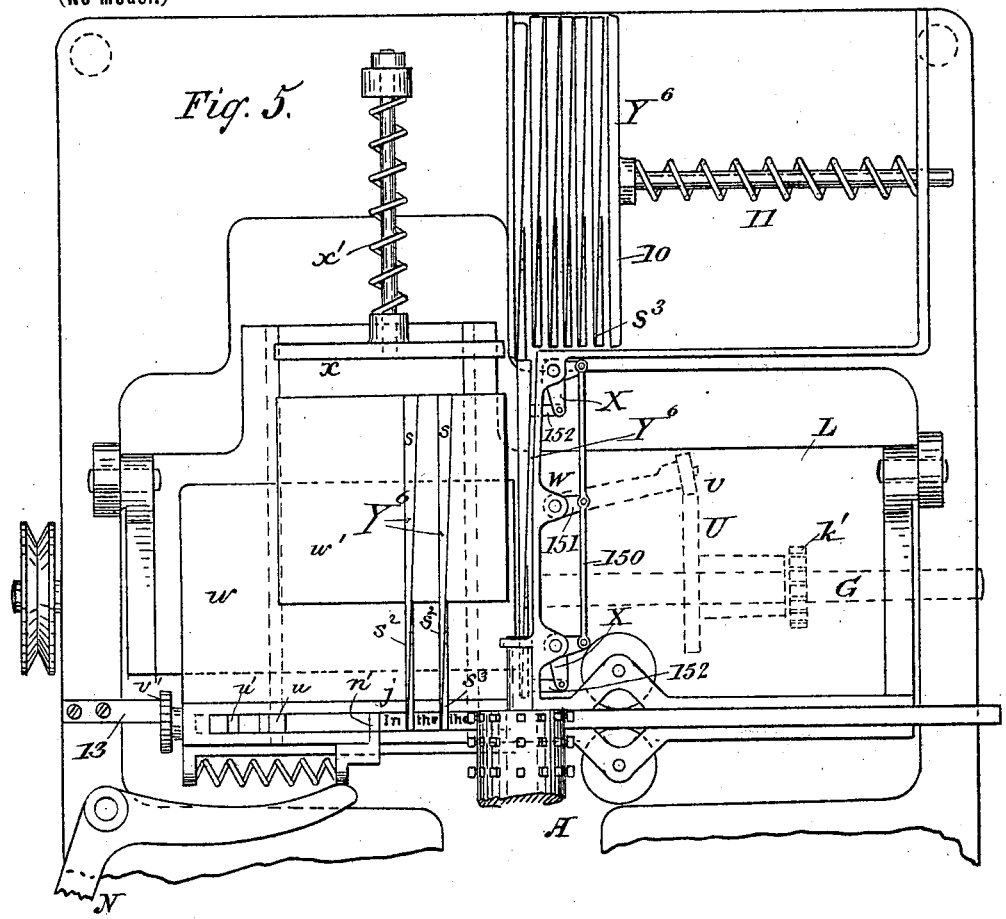
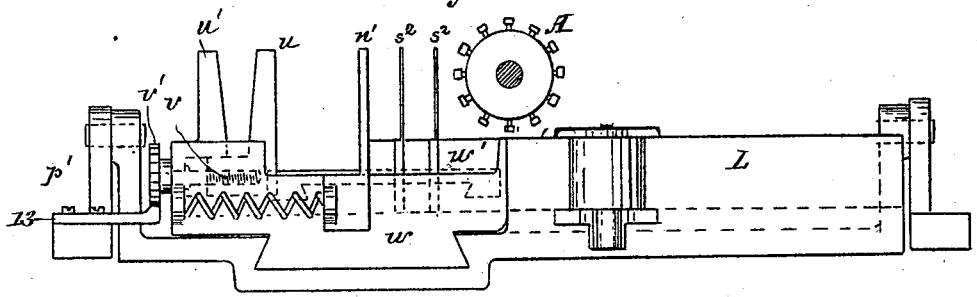
Witnesses.
Inventor:
Byron A. Brooks

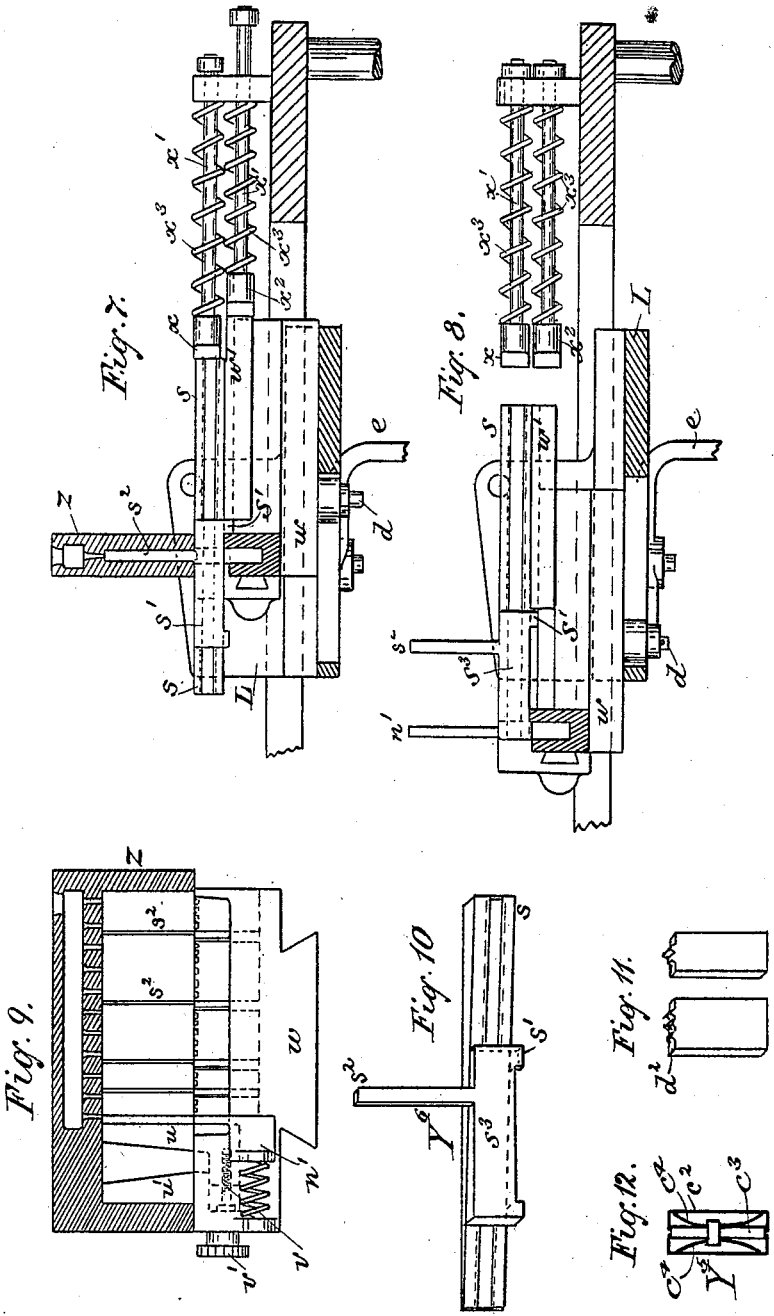

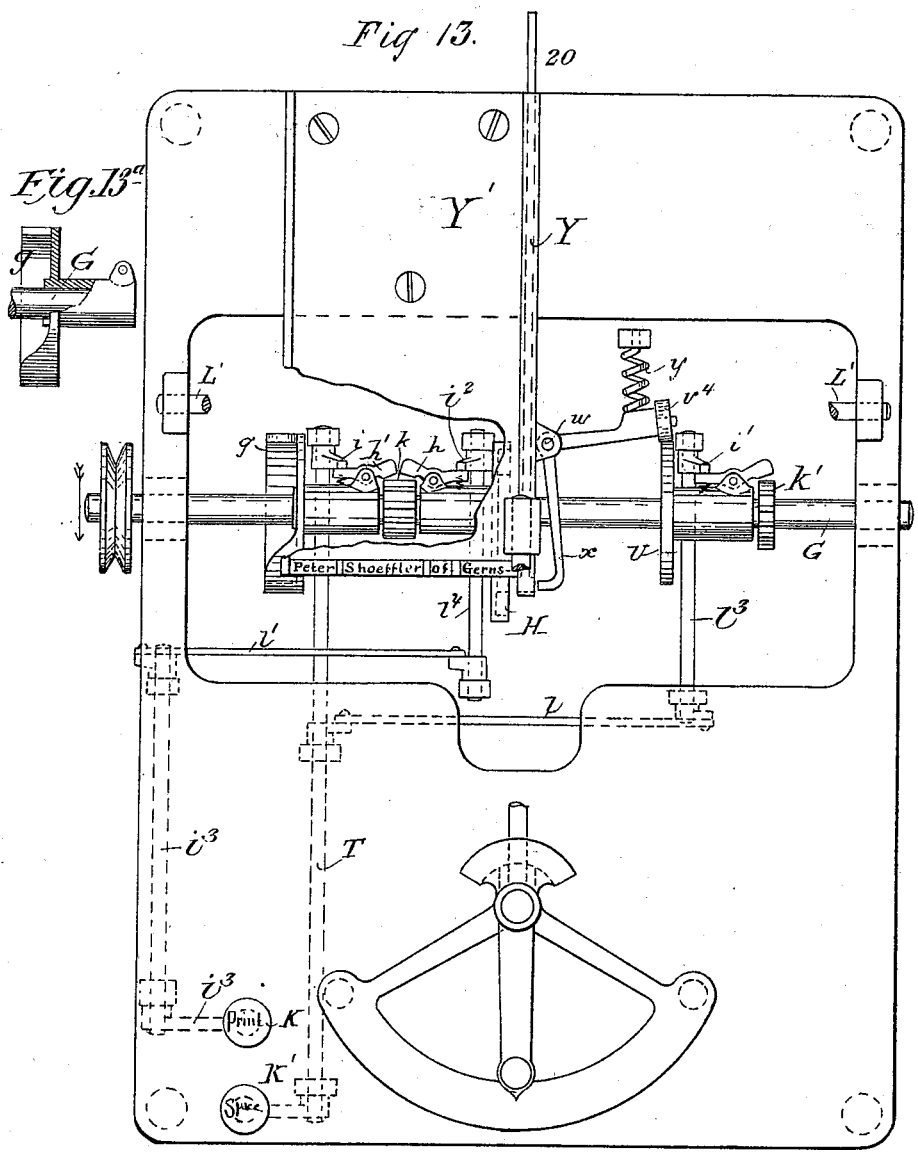

No. 635,649. Patented Oct. 24, 1899.
B. A. BROOKS.
PRINTING APPARATUS.
(Application filed Nov. 18, 1889.)
(No Model.) 9 Sheets—Sheet 7.
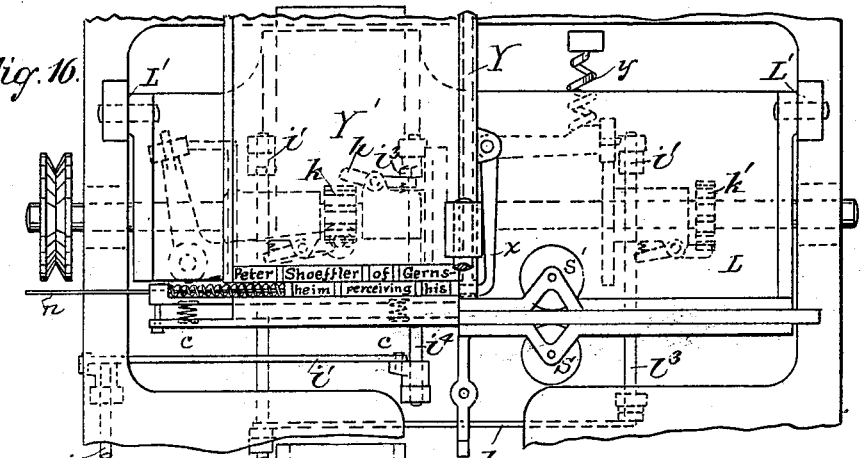
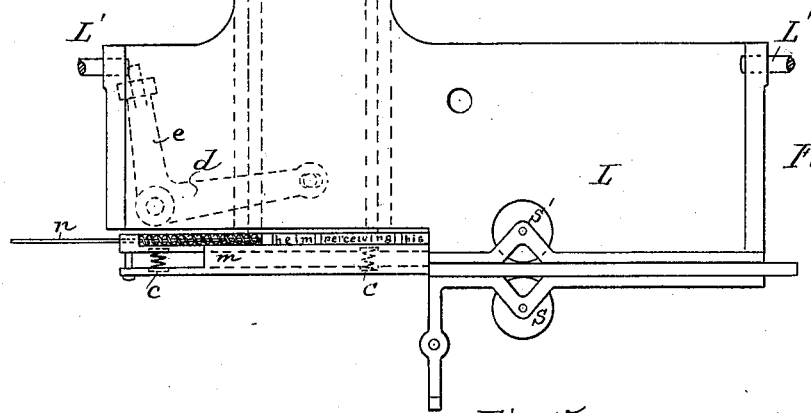
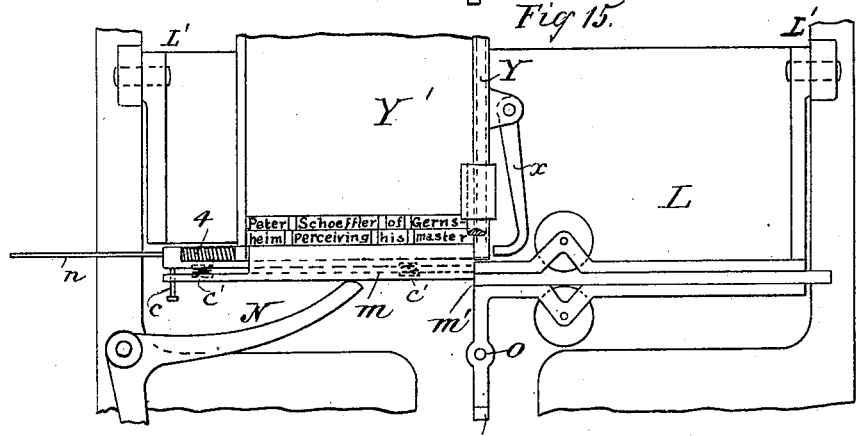
Witnesses: Inventor:

No. 635,649. Patented Oct. 24, 1899.
B. A. BROOKS.
PRINTING APPARATUS.
(Application filed Nov. 18, 1889.)
(No Model.) 9 Sheets—Sheet 8.
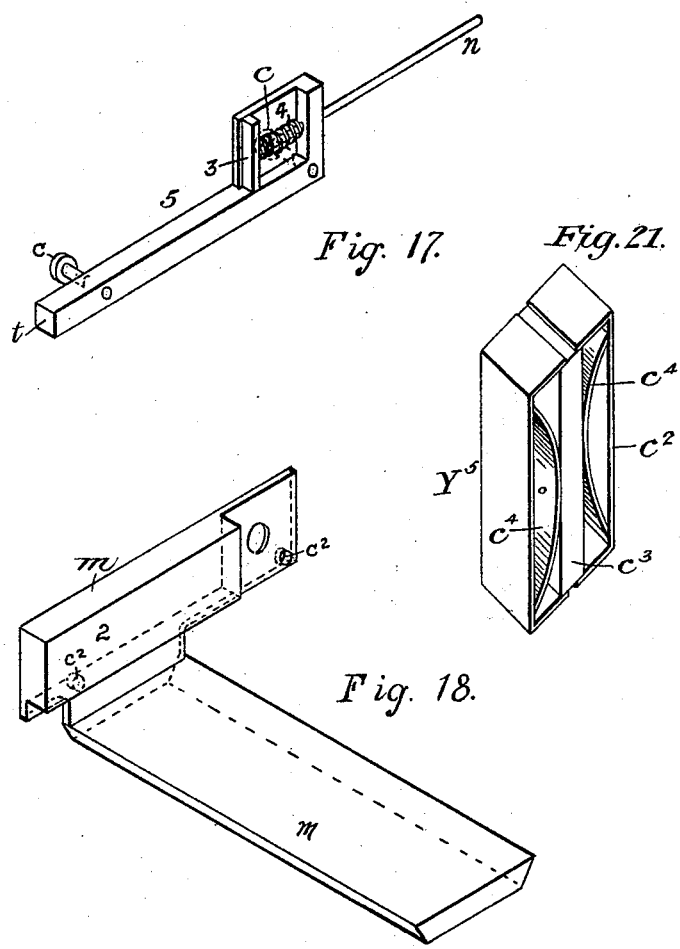
Witnesses:
Inventor:
Byron A. Brooks No. 635,649. Patented Oct. 24, 1899.
B. A. BROOKS.
PRINTING APPARATUS.
(Application filed Nov. 18, 1889.)

(No Model.) 9 Sheets—Sheet 9.

Witnesses
Inventor.

UNITED STATES PATENT OFFICE.

BYRON A. BROOKS, OF NEW YORK, N. Y.

PRINTING APPARATUS.

SPECIFICATION forming part of Letters Patent No. 635,649, dated October 24, 1899.

Application filed November 18, 1889. Serial No. 330,639. (No model.)

*To all whom it may concern:*

Be it known that I, BYRON A. BROOKS, a citizen of the United States, residing in the city of New York, (Brooklyn,) county of Kings, and State of New York, have invented certain new and useful Improvements in Printing Apparatus, of which the following is a description.

My invention relates to the art of printing;
and it consists of certain apparatus and certain novel means for forming printing-surfaces, each of which will be separately pointed out in the concluding claims.

The following is a description of the machine illustrated in the accompanying drawings, which illustrate one form in which my invention may be embodied; but it will be understood that my invention is not limited to the devices shown and described, but that various modifications may be made without departing from the spirit of my invention and without exceeding the scope of the claims concluding this specification.

The object of the following description, in conjunction with the accompanying drawings, is to enable others skilled in the art to which my invention appertains to practice the same in the form which at the present time I prefer.

The limits of each of the several features of my invention will be separately defined in the claims.

With this object in view I will now in conconcise terms describe the machine illustrated in the accompanying drawings.

Figure 19:
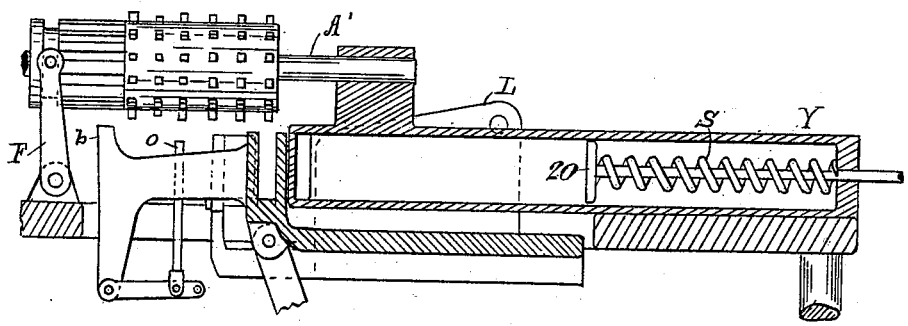
Figure 20:
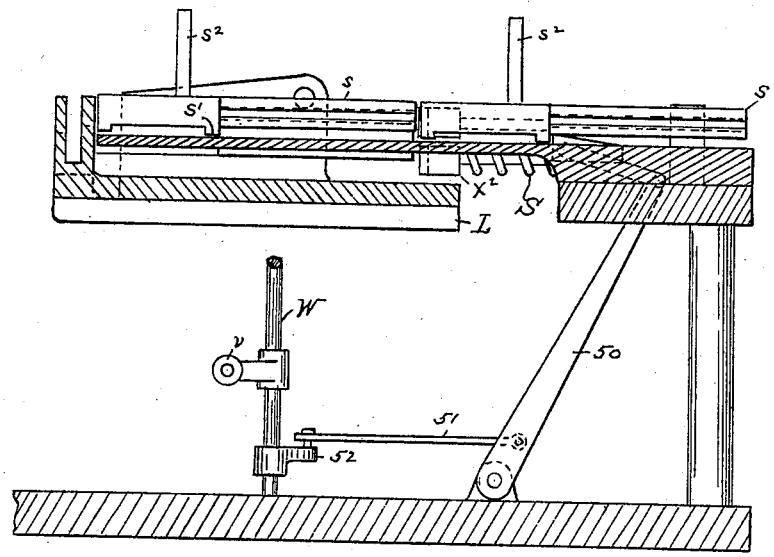

Figure 1 represents a side elevation of the machine, partly in section, on the line $xx$, Fig. 2. Fig. 1ª is a detail view of a part of the structure shown in Figs. 1 and 3. Fig. 2 is a plan view, and Fig. 3 is a front elevation, partly in section, on the line $zz$, Figs. 1 and 2. Fig. 4 is a section through the chase Y' and frame $m$. Fig. 5 is a plan view of a portion of the machine, showing the method of using wedges provided with division-strips for justifying. Fig. 6 is an end view of the same. Fig. 7 is a longitudinal section of the same, showing method of justifying. Fig. 8 is the same previous to the operation of justifying.
Fig. 9 shows a line of matrices in the casting-box before casting. Fig. 10 is a perspective of the justifying-wedge provided with a division-strip. Fig. 11 shows word-types with shoulders cast upon them for justifying. Fig. 12 represents a spring-space with shield. Fig. 13 shows the same parts as Fig. 2 with the type-cylinder and vibrating frame L removed. Fig. 13ª shows in detail part of the structure shown in Fig. 13 with portions broken away. Fig. 14 represents the frame L and its attendant parts. Fig. 15 is a part of Fig. 2 with the printing-wheel removed, showing the manner in which a line is transferred to the chase. Fig. 16 is a part of Fig. 13 with the frame L in position. Fig. 17 shows in perspective the platform on which the word-forms are set after being cut off. Fig. 18 shows in perspective the sliding table by which the line is transferred to the chase after being set up. Fig. 19 is a vertical cross-section of the machine on the line of the shaft A looking from the right, Fig. 2, and omitting everything to the left of the type-wheel, Fig. 1, and below the lower side of the part L. Fig. 20 is a longitudinal section showing in detail the manner of feeding the spaces. Fig. 21 is a perspective of the cap of the spring-space of Fig. 12.

A, Figs. 1 and 2, is a wheel or cylinder provided with types or dies for forming characters upon an impression-strip either in relief or in intaglio. If the characters are formed in relief, a cast or plate should be made from the line or form in, say, papier-mâché or wax in order to obtain the desired surface from which to form the usual electrotype or stereotype printing-plates; but these processes being well known in the art require no description here. If I form, as described herein, the characters in intaglio, the intermediate process of making an impression in some suitable material, such as papier-mâché or wax, is avoided and the operations are so far simplified.

A, Fig. 1, is a type-wheel, an extension of which is provided with spacing-pins M' and a further extension of which is cut into V-shaped teeth B. This cylinder is carried upon the shaft A', to which it is keyed, so as to be revolved thereby, but on which it is free to move longitudinally. The shaft A' is supported upon projections on the frame of the machine, as clearly shown in Figs. 1 and 2. One end of this cylinder contains a groove, into which a pin projecting from the bent lever F engages, which lever is pivoted to the frame of the machine and is connected to the keys F' F', Fig. 2. One of the said keys F' works in a slot on the lever F, so that there is lost motion between the two, while the other key F' is connected with the lever F without such lost motion. Hence the depression of one of such keys moves the pin projecting from the upper end of the lever F through a larger arc of a circle, and in this way the type-cylinder is moved on the shaft A', so as to bring one or the other rows of types above the printing or impression point.

$b$, Fig. 1, is a prong engaging in the V-shaped teeth on the cylinder extension B. This prong is carried on the vibrating frame L, Fig. 2, which is raised at each printing impression, so that the prong during the operation of printing enters a notch on the cylinder extension B, Fig. 1, locking the cylinder and insuring the type being presented squarely to the impression-strip as they approach it. The spacing-pins M' are of different lengths corresponding to the widths of the letters to which they respectively relate. There is a pin for each character and the pin corresponding to a given character is directly above the rod $o$ when its character is in position to print on the impression-strip. This rod $o$ is also carried on the vibrating frame L, which also carries the impression-strip. It is held normally in its uppermost position by the spring $p$. As the frame L rises this rod abuts against one of the pins, depressing the lever to which it is attached and which is pivoted on an extension of the projection $b$, which lever at its opposite end carries the pawl P, which engages in the ratchet-wheel R, Fig. 3, causing the pawl to slide over one or more teeth, depending upon the length of the spacing-pin operating upon it. When the frame L descends, the spring $p$ again brings the lever carrying the pawl to its normal position, thereby causing the ratchet-wheel R to turn on its axis a greater or less distance. This ratchet-wheel R is connected with a worm-gear operating the feed-rolls S, (see Fig. 3,) by means of which the impression-strip is fed forward to space between letters and words. The shaft A', Fig. 1, has rigidly connected to it a beveled gear C, which is operated by a gear-segment carried on the end of the index-lever D. (See Fig. 2.) This index-lever is provided with a hand-piece and pointer D', which swings over the letter-plate E, so that when the pointer stands opposite a given letter the corresponding type on the cylinder A is facing downward and in a position to print if in line with the impression-strip.

K, Fig. 3, is a key which when depressed sets in motion the mechanism by means of which the vibrating frame L is raised to cause the impression-strip which it carries to be pressed against the type. The mechanism by means of which this frame is raised may be thus described: G, Figs. 1, 3, and 13, is a shaft connected with a suitable source of power, which maintains it in a state of constant revolution. This shaft is provided with a cam H, Fig. 3, carried by a sleeve H' loose upon the shaft G. $k$ is a toothed wheel rigidly connected to said shaft G. The sleeve H' to which the cam H is attached carries mounted on it a pivoted locking-bar $h$, having a spring under its tail constantly tending to throw its locking end down into connection with the teeth on the wheel $k$. When this locking-bar is in connection with said wheel $k$, the cam H is revolved with the shaft G, and when the locking-bar $h$ is not in connection with the teeth on the wheel $k$ the cam H is not revolving, but remains stationary. Fig. 13$^\text{a}$ shows the sleeve to which locking-lever $h'$ is attached, said sleeve being partly broken away to show the shaft G passing through it, but not rigidly connected thereto.

I, Fig. 1, is a toggle-lever, one end of which is pivoted on the frame of the machine and another end of which is pivoted to the vibrating frame L. The extension of one of the parts of said lever carries a roller operated by the cam H. The vibrating frame L is fulcrumed in pins L', Figs. 2 and 3. This frame is supported by the toggle-lever I.

$i^4$, Figs. 3 and 13, is a rock-shaft carrying a device for disengaging the locking-bar $h$ when the vibrating frame L is to remain at rest. Rock-shaft $i^4$ is connected to the printing-key K by rod $i'$ and rock-shaft $i^3$. When the key K is depressed, the projection $i^2$, carried on the rock-shaft $i^4$, slips off the tail of the lock-bar $h$, which is then, under the influence of the spring beneath its tail, thrown into connection with the notched wheel $k$. When pressure is removed from the printing-key K, the projection $i^2$ on the rock-shaft $i^4$ returns to its normal position, and the lockbar $h$ is then released from the wheel $k$ by striking said projection $i^2$ after making a complete revolution, thus withdrawing said lockbar from connection with the wheel $k$. The projection $i^2$ is shown in the position which it occupies when the printing-key K is depressed in Fig. 3 of the drawings. It is returned to its normal position on top of the tail of the locking-lever $h$ by the spring surrounding the key-stem when pressure on the key K is released. By this mechanism whenever the printing-key lever is momentarily depressed cam H is caused to make one revolution, and one revolution only, and thereby frame L, carrying the impression-strip J, is elevated, and the impression of the type upon the strip obtained.

Referring to Fig. 3, that portion of the frame L at the left of the wheel A is provided with tracks or ways $a\ a'$.

$m$, Figs. 2 and 18, is a table carrying the logotypes or, in other words, the material which is cut off from the impression-strip J, and this table slides on said ways $a\ a'$. This table has a sliding motion to and from the observer viewing Fig. 3. The impression-strip J as it is fed along by the feed-rollers $s\ s'$ projects into this sliding frame $m$. (See Fig. 2.) When said table is slid backward, its edge, operating in conjunction with the edges of the stationary groove in which the strip J is fed forward toward said table, acts as a shears to cut off the strip at $m'$, Fig. 15. The frame $m$ is caused to slide backward to cut off the strip J by means of the lever-arm $d$, attached thereto, Figs. 3, 4, and 14, having a rocking arm $e$, which is fulcrumed on the frame L, said frame being returned to its initial position by a spring $e'$, Fig. 3. This rocking arm extends downward and is provided with a roller $f$, resting against the surface of the cam $g$, carried on a sleeve on the shaft G.

Referring to Fig. 13, when the space-key K' is depressed the projection $i$ is moved by the rock-shaft T and releases the locking-bar $h'$ and causes the sleeve to which said locking-bar is attached to make one revolution in the manner already described with reference to cam H. The cam $g$ then rocks the lever-arm $e$, Fig. 3, and causes the frame $m$ to slide backward in the tracks $a\ a'$ a distance sufficient to cut off that portion of the strip J which projects from the strip-channel on the cutting being done at the line $m'$. It is also necessary that the material J should be fed forward to space between words. This is accomplished by means of a cam U, Figs. 1 and 3, which is also attached to a sleeve loose upon the shaft G.

$i'$ is a projection for tripping its lock-bar to lock the sleeve to or unlock it from the wheel $k'$, fixed to the shaft, and for causing the cam U to make one revolution. The rock-shaft $l^3$, carrying the projection $i'$, is attached to the space-key $k'$ by means of the connecting-rod $l$ and rock-shaft T. The parts operate in the manner already described and cause the cam U to make one complete revolution. Referring to Figs. 1ᵃ and 3, it will be seen that this cam U is connected with the worm Q by means of the ratchet-wheel $r$, pawl $r''$, and bar $r'$, attached to said pawl. This worm, as already described, operates the feed-rollers S S', by means of which the material is fed forward.

Referring to Fig. 13 it will be seen that the shearing mechanism is set in operation by the depression of the space-key, and that the mechanism for feeding in a space is set in operation by the same key, the cams being properly timed so that one operation follows the other; but this space-key is not connected with the mechanism for feeding the strip. On the other hand, the strip is fed forward by mechanism set in operation by the printing-key, which causes the strip to rise and come in contact with the type, the strip being fed forward after each type impression upon the return of the type-plate. The feeding-rolls are operated by cam U. (See Fig. 1ᵃ.) The material forming the space between words is thus formed on the forward end of the word-slug. Referring to Fig. 13 it will be seen that this cam U also operates the bent lever $x$, by means of which a space is pushed onto the table $m$ after the material is cut off. This mechanism will be hereinafter more fully described.

As the successive impressions are made on the strip J it is fed forward, as already described, to space between letters by the pawl P and ratchet-wheel R, Fig. 1, pushing the word-forms $j$, Fig. 2, along in their channel against the spring 4 until the word is completed, when by the depression of the space-key K' the table $m$ is moved back, cutting off the strip. Then the space-feed lever $x$, Fig. 2, pushes a space into the channel, shoving the word-forms $j$ along against the head 3 and spring 4. In inserting the spring-spaces the end of the line is held up by pressure of the arm $x$, transmitted through the side of an intervening space until it is returned to its printing position, when it is brought against the end of the line of material J. When the wedges are used, no pressure is exerted against the word-forms until they are transferred to the chase $w$. Then the table $m$ is returned by a suitable spring, which brings the channel with the spaces in it in line with the blank strip J of material. This is continued until the line is full. The feed P is a variable feed to feed the strip the width of the letter impressed, while the feed $r'$ has a fixed movement to feed the material a given distance at the end of each word, as in an ordinary typewriter, to give a space between words. It is now necessary to transfer the new line to the chase Y', Figs. 2, 4, 15, and 16. This is accomplished by the bent lever N, Fig. 2, operated by hand. The end of this lever rests against the front of the table $m$. This table and its attendant parts are shown in perspective in Figs. 17 and 18. Fig. 18 shows the sliding table $m$ proper. Carried on this table is the type-platform $t$. (Shown in Fig. 17 removed therefrom.) The platform $t$ on which the word-types rest is provided with pins $c\ c$, which travel in ways $c^2\ c^2$ in the table $m$. Springs $c'$ (see Fig. 4) surround the pins $c\ c$ and keep the platform $t$ just up in front of the projection 2 on the table $m$ when the platform is receiving types. The platform $t$ is provided at one end with a movable head 3, to which a pin $n$ is attached, surrounded by coiled spring 4, which constantly presses the movable head 3 forward. As the words are transferred to the platform $t$ by strip J they push this movable head 3 back. The projection 2 on the table $m$ forms a back at one side of the platform $t$ when it is receiving the logotypes and fits in that part of the type-platform $t$, Fig. 17, where the back is cut away and where the reference-figure 5 is placed. The construction of these parts is shown in Fig. 4. When the table $m$ is slid back on its ways, the platform $t$, carried on the pins $c\ c$, strikes the front end of the chase Y' and is arrested, compressing the coiled springs, Fig. 4, surrounding the pins, and as the table $m$ continues its motion the projection 2 shoves the line of types on the platform $t$ onto the chase, the type-platform $t$ remaining stationary against the chase, while the table $m$ is completing its motion. In this way line after line of word-types after they are formed are transferred from the platform $t$, on which they rest, to the chase $Y'$. When the line is incomplete, as at the end of a paragraph, blanks are fed in to complete the line. The chase $Y'$ is, as shown in Fig. 2, screwed to the frame of the machine. A section of this chase is shown in Fig. 4.

The spring-spaces $Y^5$, which are shown in detail in Fig. 12, are carried in a box $Y$, Figs. 2 and 15, and are constantly pressed forward in said box by means of a piston 20, Fig. 19, operated by a spring in the ordinary way. These spaces $Y^5$ consist of caps $c^2$ $c^2$, Fig. 12, a stem $c^3$, on the ends of which said caps rest, and springs $c^4$, attached by rivets, as shown, although they might be attached in any other suitable manner to said stem. This stem is a rectangular block closely fitting within the caps. The caps do not touch each other except when the springs $c^4$, constantly pressing them apart, are sufficiently compressed to permit them to do so. As the table $m$ after the formation of each word is pressed back to cut off the impression-strip, as before described, the hook $x$, Fig. 16, pushes one of these spaces from the box $Y$ onto the type-platform $t$, after which, as has already been described, the material $J$ is fed forward onto the type-platform $t$ and under the type which stands at the printing-point. Without further description the operation of the spring-spaces $Y^5$, Fig. 12, will be readily understood. As the springs in all the spaces are of the same power, an equal space between the words will be secured. The magazines may be filled by hand.

After the requisite number of lines of logotypes have been transferred to the chase $Y'$ a stereotype or electrotype plate may be made therefrom in any suitable way.

It is not necessary that the stereotype or electrotype cast be made from the matter after it has been transferred to the chase $Y'$. I may, for example, make a cast from each line before it has been transferred to the chase. In this case I prefer to use spaces $Y^6$, such as are shown in perspective in Fig. 10, each space being provided with a division-strip $s^2$ and with wedges $s^3$, by means of which the lines are justified. A machine constructed for this purpose is shown in Figs. 5, 6, 7, 8, and 9 of the drawings.

Referring to Fig. 5, $Y^6$ are the spaces carried in a box provided with a diaphragm 10, constantly pushed forward by the coil-spring 11. The last space in this box is moved longitudinally down toward the material on which impressions are made by the device shown in Fig. 20. 50 is a bent arm pivoted to the base-plate of the machine, connected by a lever 51 to a crank 52 on the shaft $W$, so that after the space in line with the impression-strip has been fed forward onto the platform $W'$ the bent lever 50 strikes the end of the last spaces in the magazine and pushes it longitudinally forward in front of the impression-strip. When the strip is sheared off after a word, a space is moved sidewise into place by means of bell-crank levers $X$ $X$ in substantially the way already described with reference to feeding the spring-spaces $c^2$—that is to say, by the mechanism which is in the main indicated by dotted lines in Fig. 5 and which has been hereinbefore particularly described. The cam $U$ operates an arm 151, to which is pivoted rod 150, at the opposite ends of which are bell-crank levers $X$ $X$, carrying pins abutting against the sides of said spaces. When the arm 151 is depressed by the operation of the cam $U$, the pins 152 are pressed against the sides of the spaces, shoving them forward in position.

Referring to Figs. 7 and 8, it will be seen that the table for the support of the spaces must be the same height as the table on which the legs of the spaces rest, as shown in Fig. 8. The legs $s'$ of the spacer $s^3$, as shown in Fig. 10, hold the wedges $s$ slightly above the surface of the table, so that they can be moved freely thereon. The wedges rest upon the same table as do the word-slugs and are therefore reciprocated back and forth with them. The front leg of the spacer $s^3$ is in front of the raised portion of the casting-box when it is fed in, as shown in Fig. 8. The long wedges $S$ of the spaces $Y^6$ are supported when in place between logotypes on the plate $w'$, Fig. 5. Instead of employing the frame $m$ with the type-platform $t$ heretofore described I employ in this machine a casting-box. This box consists of two parts, one of which is a sliding table $w$, Fig. 6, substantially like the sliding table $m$, Fig. 18, on which is set a casting-box $Z$, Fig. 9. The table $w$ is supported in ways in the frame $L$ in the same manner as the frame $m$. (Shown in Fig. 3.) This casting-box has a movable end $u$, which is connected with a screw $v$, Fig. 6, to which the ratchet-wheel $v'$ is attached. Referring to Fig. 6, it will be seen that there is a fixed pawl 13 carried on the frame of the machine, which pawl meshes in the teeth of the ratchet-wheel $v'$, so that each time the sliding frame $w$, carrying said ratchet-wheel, moves forward and backward the pawl 13 causes the ratchet-wheel $v'$ to advance one tooth, thereby sliding the movable end $u$ of the casting-box a definite distance back, lengthening the casting-box by just so much. The object of this device is to insure each line of words, after they are cast and after the division-strips have been removed, being precisely the same length no matter of how many words the line may be composed.

It will be observed that in the operation of cutting off the strip after each word is formed the table $w$ is not moved back far enough to bring the ends of the wedges against the back plate $x$. So that although the strip is cut off after each word and the casting-box lengthened by the width of the division-strip after each word, yet the justifying is not accomplished until the lever N is operated, pushing the table back far enough to bring the ends of the wedges against the back plate. The slide $w$ has fixed to it the lower section of the mold in the form of a trough open at one end to receive the strip $j$ and having the movable end $u$.

$u'$ is a fixed portion of the frame in which the casting-box is set and through which the adjusting-screw $v$ passes, which is attached to the movable end $u$.

$n'$ is a movable support to sustain the word-blocks in position until the mold is filled. After the word-blocks and spaces are assembled in line the upper section of the mold is placed over the assembled and justified line and pressed down closely against the top of the lower section of the mold, thus forming a tight joint. The type-metal is then poured into the chamber in the top of the mold and is distributed by small openings beneath the chamber. (See Fig. 9.) The end of the line next to the strip $j$ is held in position by the movable support $n'$ until the casting-box is filled or nearly filled, when the support $n'$ is moved back against the end $u$ by the pressure of the wedges, thereby preventing further movement of the word-forms. After the block of types thus formed has been removed from the mold the casting-box, with the slide $n$, is returned to its initial position by the release of the lever N.

After the line has been formed of logotypes separated by spaces carrying division-strips and said division-strips and spaces have been removed and the logotypes shoved up together it is clear that a line composed of six words, for example, would not be of the same length as a line composed of ten words, for example, unless some provision had been made by varying the length of the casting-box to compensate for the space occupied by division-strips. As in this machine my object is to cast each line as it is formed and then on removing the division-strips and shoving the logotypes up in contact to have a justified line of words of the required length, in which each logotype will have its space cast on its side, I lengthen the box by the width of a division-strip each time a division-strip is introduced therein. This is done by the mechanism last described. Fig. 11 shows two logotypes, on each of which the necessary metal $d^2$ to form the required space between them when assembled is cast.

The spaces $Y^6$ (shown in Fig. 10) are each provided with a wedge $s^3$, having a projection $s'$, and a wedge $s$, which is much longer than the length of the wedge $s^3$. After the line on the table $w$ is completed it is necessary to justify it and to bring the division-strip $S^2$ between the words in the casting-box. The mechanism by which this is accomplished is shown in Figs. 5, 7, and 8. Fig. 8 shows the position which the spaces, division-strips, and wedges occupy before they have been pushed forward to bring the division-strips between the logotypes; and Fig. 7 indicates the position which the same parts occupy after they are brought into position ready for casting.

$x$ and $x^2$ are pistons carried by rods $x'$ $x'$ and constantly pressed forward by coiled springs $x^3$ $x^3$. A top view of the piston $x$ is shown in Fig. 5. As the sliding frame $w$ is pressed back by lever $n$, Figs. 2 and 5, the rear end of the plate $w'$, Figs. 7 and 8, abuts against the piston $x^2$ at one end and against the projection $s'$ on the spacer $s^3$ at the other end. This piston as the table $w$ moves backward shoves all the spaces forward until the inner side of each of the projections $s'$ on the wedges $s^3$ comes in contact with the edge of the casting-box. The piston $x$ abuts against the broader ends of all the long wedges $s$, by which they are driven forward to justify the line. As all of the wedges are thus pressed forward simultaneously, an equal space is obtained between each word. The casting-box $z$ is then placed in position, as shown in Fig. 7. The cast of the justified line is now taken in any suitable way, and after the cast is removed from the casting-box the spaces, with the division-strips, are removed and the line of logotypes, with suitable spaces cast on their ends, are set up in columns. The casting-box is shown in detail mounted upon the sliding frame $w$ in Fig. 9 of the drawings. Fig. 8 shows the spaces and wedges before they are driven home, and Fig. 7 shows them after they are driven home, with the casting-box $z$ in position. Fig. 12 represents in detail one of the spring-spaces Y.

In a patent granted to me December 10, 1889, No. 417,142, the application for which was pending contemporaneously herewith, I have claimed the methods of preparing printing-surfaces consisting, first, in impressing letter-dies on a bar of suitable material, then cutting said bar between words, and then locking the logotypes thus obtained in lines or forms by pressure applied to their sides or ends, and, second, impressing letter-dies on a bar of suitable material, then cutting said bar between words, and then setting up and justifying the logotypes thus obtained in lines or forms by printers' spaces, and, third, impressing relief letter-dies on a bar of suitable material, then cutting said bar between matrix word-forms, and then locking the matrix-logotypes into lines or forms by pressure applied to their sides or ends, and I therefore do not claim herein specifically such methods; but I do herein, among other things, claim mechanisms for carrying such methods into effect.

As far as some of the features of my invention are concerned, individual type might be employed instead of a strip, with the letters formed therein or thereon, as above described, and in general it should be remarked that many of the details and combinations and operations illustrated or above described are not essential to the several features broadly considered. All this will be indicated in the concluding claims, as the omission in a claim of an element or the omission of reference to the particular features of the elements mentioned is intended to be a formal declaration of the fact that the omitted elements or features are not essential to the invention therein covered.

In the foregoing specification I have incidentally referred to a few of the obvious modifications which may be adopted in practicing my inventions; but I have not endeavored to specify all the modifications which might be employed, because I understand that such an enumeration is not required here and would not be desirable even if it were possible, the object of this specification being to instruct persons skilled in the art to practice my inventions in their present preferred form and to enable them to comprehend their nature, and I desire it to be distinctly understood that mention by me of a few modifications is in no way intended to exclude others not referred to, but which are within the spirit and scope of my several inventions.

I do not herein claim, specifically, the use of elastic or compressible spaces described herein, as specific claims for such subject-matter are contained in my pending application, Serial No. 693,077, filed October 10, 1898, although the use of such spaces is included in the terms of some of my claims herein.

Having thus described a machine embodying all my present inventions, what I claim, and desire to secure by Letters Patent, is—

1. In a machine for forming printing-surfaces, the combination of word-matrices with a casting-box consisting of suitable sides and movable ends, and means for casting logotypes provided with justifying-spaces attached thereto.

2. In a type-surface to be electrotyped or stereotyped, the combination of a wedge-space provided with a division-strip set between types and projecting above the surface thereof.

3. In a machine for forming printing-surfaces, the combination of means for forming the characters upon a bar of suitable material, means for cutting said bar between words and for inserting spaces or wedges between them to justify the line.

4. In a machine for forming printing-surfaces the combination of means for impressing in a bar of suitable material, means for cutting said bar between words and for inserting between said words spaces provided with division-strips and means for taking a cast therefrom.

5. A printing-surface consisting of a plurality of lines, composed of a series of logotypes provided with justifying-spaces integral therewith, and of different widths in different lines, to form, as assembled, justified lines.

6. The combination, with means for forming logotypes, of means for forming thereon, simultaneously, at the end or ends of the same, justifying-spaces of variable width integral with the logotypes.

7. In a matrix-forming machine, the combination of a type wheel or cylinder, spacing-pins and toothed wheel.

8. In a matrix-forming machine, the combination of a cam U, rock-shaft W, arm X and spaces Y.

9. In a matrix-forming machine, the combination of vibrating frame L, pins M', pin O, feed-rolls S' and S' and pawl and ratchet for feeding the material.

10. In a matrix-forming machine, a frame carrying the material to be impressed, and a cam and lever for pressing the said material against the type, and an independent key for causing the material to be pressed upon the type, and means for cutting said material between words.

11. In a matrix or type forming machine, a frame carrying the material to be impressed combined with a constantly-revolving shaft, a cam and lever intermittently connected with, and operated by said shaft, a toothed wheel attached to said shaft, a loose sleeve mounted on said shaft and carrying a dog and means for intermittently engaging and disengaging the dog with said toothed wheel, a key-lever for connecting said cam with said shaft intermittently, for the purpose of impressing the material against the type.

12. In a matrix or type forming machine, the combination of an index-lever, a type-wheel, a constantly-revolving shaft, a cam and lever intermittently connected with and operated by said shaft, a key-lever for connecting with said shaft intermittently for the purpose of impressing the material against the type, a toothed wheel attached to said shaft, a loose sleeve mounted on said shaft and carrying a dog, and means for intermittently engaging and disengaging the dog with said toothed wheel.

13. In a matrix or type forming machine, the combination of mechanism for impressing the material against the type successively to form words, mechanism for cutting off the words as formed, and mechanism for introducing spaces between the words as cut off.

14. In a matrix or type forming machine, a casting-box, the bottom of which consists of a line of matrices, said box being divided by partitions into separate compartments and said partitions being formed of division-strips attached to spaces set between words.

15. In a matrix or type forming machine, a casting-box having a movable end, and means by which the length of said box is adjusted a distance determined by the number of words in the line.

16. In a matrix or type forming machine, the combination of a casting-box, types, spaces, division-strips, and means, substantially as described, for elongating the box an amount determined by the number of division-strips contained therein.

17. In a matrix or type forming machine, a table to which the lines are transferred after being formed, a platform on which the line rests while being formed, and means, substantially as described, for transferring, after it is formed, the line from said platform to said table.

18. In a matrix or type forming machine, a platform, a plurality of words separated by wedge-spaces carrying division-strips set on said platform, and means, substantially as described, by which said platform is vibrated thereby bringing said division-strips in line with the words and automatically justifying said line.

19. In a machine for forming printing-surfaces, the combination of a suitable casting-box, with means for casting therein logotypes, and means for forming thereon, simultaneously, at the end or ends of the same, justifying-spaces of variable width integral with the logotypes.

20. In a machine for forming printing-surfaces, the combination with a casting-box of a series of word-matrices, spaces and division-strips set between said matrices, and means whereby logotypes provided with shoulders may be cast simultaneously corresponding with said matrices.

21. In a machine for forming printing-surfaces, the combination of type-matrices with a casting-box provided with a movable end, and means for adjusting said end a distance determined by the number of words in the line.

22. In a machine for forming printing-surfaces, the combination with a suitable casting-box of means for simultaneously casting a full line of logotypes with suitable spaces attached thereto, to form, when the logotypes are removed from the casting-box and assembled, a justified line.

23. In a machine for forming printing-surfaces, the combination with a suitable casting-box, of a line of matrices, spaces and division-strips, with means for justifying said line and casting therefrom a justified line of logotypes.

24. In the preparation of printing-surfaces, the combination of means for forming on a suitable bar word-matrices, means for inserting spaces between said word-matrices, means for assembling the word-matrices and spaces in lines or forms, and means for justifying the lines by pressure.

25. In a type-surface to be electrotyped or stereotyped, the combination of a space provided with a division-strip set between words and projecting above the surface thereof.

26. In a machine for making printing-surfaces, the combination of means for impressing the characters in a bar of suitable material, means for cutting said bar between words and inserting spaces, and means for justifying said line by lateral pressure.

BYRON A. BROOKS.

Witnesses:
J. EDGAR BULL,
WM. M. VALENTINE.